Patented Apr. 26, 1927.

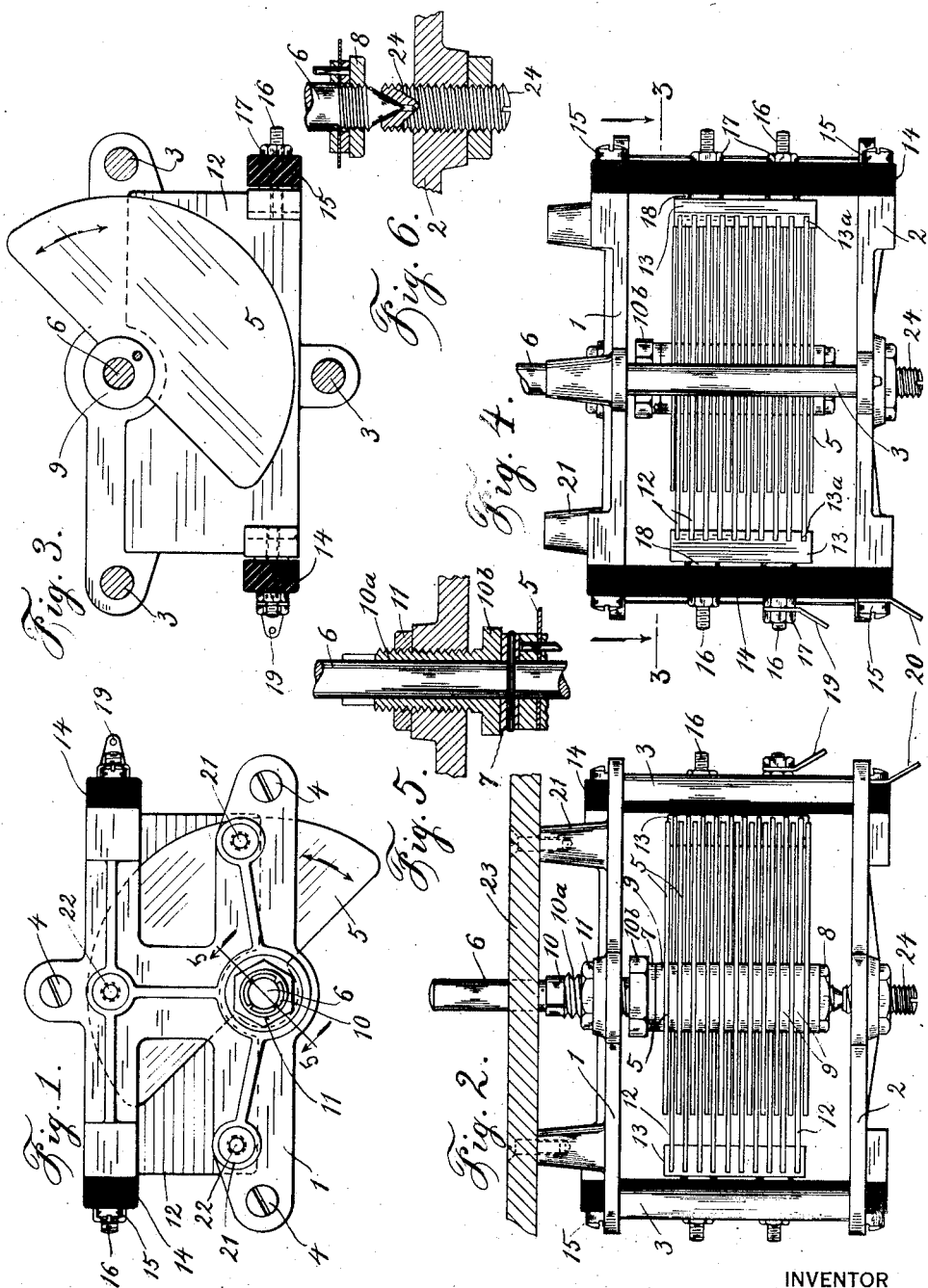

1,626,391

UNITED STATES PATENT OFFICE.

ALLEN D. CARDWELL, OF ROCKVILLE CENTER, NEW YORK, ASSIGNOR TO THE ALLEN D. CARDWELL MANUFACTURING CORPORATION, OF NEW YORK, N. Y., A CORPORATION OF NEW YORK.

VARIABLE AIR CONDENSER.

Application filed September 26, 1922. Serial No. 590,576.

My invention relates to improvements in variable air condensers and has particular reference to the class of condensers wherein a series of metal plates, comprising the rotor element, operate between a series of metal plates comprising the stator element.

One of the objects of my invention is to provide a condenser of the class specified so organized that when it is mounted on a panel or other support the electrostatic capacity or surface leakage shall not be varied to any material extent; another object is to so arrange the mechanical support for the rotor that it shall be rigid and that temperature or atmospheric changes will not change the physical or electrical relationship between the movable and the stationary plates or elements; a further object is to provide a condenser which shall have a high ratio of minimum to maximum capacity, and wherein the minimum capacity will be very small; a further object is to provide a condenser wherein the dielectric losses shall be small.

In carrying out my invention I provide a metal frame, a rotor element comprising a series of spaced metal plates, a stator element comprising a series of spaced metal plates adapted to receive the first named metal plates therebetween and out of electrical contact therewith, one of said elements being carried by and in electrical contact with said metal frame, the other element being carried by said frame and insulated therefrom. In the preferred form of my invention illustrated in the accompanying drawings the rotor is pivotally supported by and in electrical contact with said metal frame and the stator plates are carried by metal blocks which are supported by insulating pieces or strips that are secured to the metal frame, said insulating pieces being shown located on the supporting frame externally to the electrostatic field and by preference the metal blocks that support the stator plates are maintained at a distance from the insulating pieces to remove any broad area of conducting material away from any dielectric other than the surrounding air, whereby a minimum of electrical contact with the insulating supporting pieces is effected.

My invention also comprises novel details of improvement that will be more fully hereinafter set forth and then pointed out in the claims.

Reference is to be had to the accompanying drawings forming part hereof, wherein—

Fig. 1 is a plan view of a variable air condenser embodying my invention;

Fig. 2 is a side view of Fig. 1;

Fig. 3 is a section on line 3, 3 in Fig. 4;

Fig. 4 is a side view looking toward the bottom of Fig. 3;

Fig. 5 is a detail section on line 5, 5 in Fig. 1;

Fig. 6 is a detail section of the step-bearing for the rotor shaft.

Similar numerals of reference indicate corresponding parts in the several views.

The main frame of the condenser is shown comprising spaced metal end pieces 1, 2, provided with interposed posts 3 that connect the pieces 1, 2 securely together, as by means of screws 4. The rotor element comprises a series of spaced metal plates 5 secured upon the common shaft 6 by means of a shoulder or stop 7 formed with or secured to shaft 6 and a nut 8 on said shaft, washers 9 of suitable thickness being interposed between the plates 5 to space them apart. The shaft 6 is rotatively supported in the main frame so that the rotor plates may be rotated in either direction as desired. A screw 24 threaded in frame piece 2 is shown provided with a countersunk upper end receiving the tapering lower end of shaft 6, the upper portion of said shaft being shown journaled in a bearing 10 having threads 10$^a$ engaging corresponding threads in frame piece 1. The bearing 10 is shown provided with a head 10$^b$, and a nut 11, whereby the bearing may be retained set in adjusted position respecting frame piece 1. The stator element comprises a series of spaced metal plates 12 adapted to receive the plates 5 of the rotor therebetween. The stator plates 12 may be of suitable shape and are shown supported at corresponding corners by means of metal blocks 13 that are shown provided with spaced slots 13$^a$ to receive the corresponding edges of said plates. The metal blocks 13 serve to connect all of the stator plates electrically and said blocks are so spaced that the plates of the rotor may rotate therebetween but out of contact therewith. The metal blocks 13 are supported upon insulating strips or bars 14 that are secured to the end pieces 1, 2 as by means of screws or studs 15. The strips 14 are shown relatively narrow and extending in a direction across the plane of the stator element, as at right angles to the end pieces 1, 2 and to the rotor and stator elements, whereby a minimum exposure of dielectric 14 is presented to the electrostatic field. The metal blocks 13 are shown provided with outwardly projecting studs or screws 16 that extend through holes in the insulating strips or bars 14 and are secured by means of nuts 17 on said studs, whereby the blocks are suspended from the insulation. By preference, to decrease the area of contact between the metal blocks 13 and the insulating strips or bars 14 washers 18 are located therebetween to remove any broad area of conducting material away from any dielectric other than the surrounding air. A conductor may be connected with the stator by means of any suitable terminal, indicated at 19, connected with one of the posts 16 and retained by a nut 17, and the rotor may be connected with another conductor as by means of a terminal 20 in electrical connection with one of the end pieces of the main frame, such as piece 2, by one of the screws 15, or in any other desired way. The end piece 1 is shown provided with studs or projections 21 which may be secured to said end piece in any desired way, which projections are shown provided with holes 22, preferably threaded to receive screws to secure the condenser to a panel or other support indicated at 23.

From the foregoing it will be understood that the parts of the condenser may be secured in firm relation so that the rotor element may operate, as required, with relation to the plates of the stator element. The arrangement is such that the movable plates can be operated without materially changing the capacity of the condenser as a whole with respect to adjacent objects, and by having the corresponding element grounded on the main frame the corresponding plates are kept at lowest potential so that close proximity of the operator's hand will have minimum effect. The arrangement described, also, is such that when the condenser is mounted on a panel or on other desired supporting means, the electrostatic capacity or surface leakage will not be varied and the mechanical support for the rotor, as in the example illustrated, is rigid and of such material, such as metal, that a change in temperature or atmosphere will not change the physical or electrical relationship between the movable and stationary elements. With the main frame made of metal forming supports for the bearings for the rotor, the position or the pressure of the bearings will not be variable. Furthermore, with the supporting blocks 13 for the plates of the stator being of single pieces of metal, the liability of a change in the physical relationship between the rotor and the stator plates is reduced to a minimum and the ruggedness of the condenser is increased. Since the insulation required is a minimum the electrostatic losses are correspondingly small. The relation between the stationary plates and the metal frame work that supports them always remains permanent and since the frame and posts are always in circuit with the rotor, the movement of the rotor with respect to the posts 3 does not vary the capacity of the condenser. The high potential or insulated side of the condenser is fixed in its relation to other objects in space or in the apparatus in which the condenser is used whereby there is no change in the electrostatic capacity of the condenser relative to these external objects when the movable element or rotor plates are rotated except the increase in capacity due to the increase of effective area of the plates. The amount of supporting dielectric 14 is reduced to a minimum and the surface leakage is correspondingly reduced. The dielectric or hysteresis losses are reduced by reason of the insulating material 14 being placed externally to the electrostatic strain and shielded from the field of the rotor by means of the metal blocks 13 being intermediate between such field and the insulating strips.

Having now described my invention, what I claim is:—

1. A variable air condenser comprising a conducting frame including spaced metal end plates, a rotor element journaled therein and comprising a series of spaced conducting plates, a stator element, conducting blocks electrically connected to and supporting the stator element, and insulating means extending in a direction across the plane of the stator element and secured to said end plates, said conducting blocks being secured to and supported by said insulating means.

2. A variable air condenser comprising a conducting frame including spaced metal end plates, a rotor element journaled therein and comprising a series of spaced conducting plates, a stator element, metal blocks provided with spaced slots receiving the plates of the stator, and insulating strips extending in a direction across the plane of the stator element and secured to said end plates, said metal blocks being suspended by said insulating strips.

3. A variable air condenser comprising spaced end pieces, posts securing said pieces together, one of said pieces being of conducting material, insulating strips each secured to both of said end pieces, and a stator supported by said insulating strips and comprising spaced metal plates alternating with the plates of the rotor.

4. A variable air condenser comprising spaced end pieces, one or more posts securing said pieces together mechanically and electrically, one of said pieces being of conducting material, insulating means supported by both of said pieces, a stator supported by said insulating means and comprising spaced metal plates alternating with the plates of the rotor, conducting blocks provided with spaced slots receiving the stator plates, and means suspending said conducting blocks from said insulating means.

5. A variable air condenser comprising spaced end pieces, one or more posts securing said pieces together mechanically and electrically, one of said pieces being of conducting material, insulating means supported by said pieces, a stator supported by said insulating means and comprising spaced metal plates alternating with the plates of the rotor, conducting blocks provided with spaced slots receiving the stator plates, and means supporting said conducting blocks upon said insulating means, said conducting blocks being spaced from said insulating means to limit the area of electrical contact therewith.

6. A variable air condenser comprising a main frame having conducting end pieces, a rotor supported by said end pieces, insulating strips secured to both of said end pieces, and a stator element located between said end pieces and supported by said insulating strips, said strips extending in a direction across the plane of the stator element.

7. A variable air condenser comprising a main frame having conducting end pieces, a rotor supported by said end pieces, insulating strips secured to said end pieces, and a stator element located between said end pieces and supported by said insulating strips, said insulating strips being located exterior to the electrostatic field that is adjacent to the edges of said stator and rotor.

8. A variable air condenser comprising a main frame having metal end pieces, a rotor, a stator having spaced plates, insulating means secured to both of the end pieces and extending in a direction across the plane of the stator, and connecting means for the stator plates suspended and spaced from said insulating means.

9. A variable air condenser comprising a main frame having metal end pieces, a rotor, a stator having spaced plates, insulating means carried by said frame and extending in a direction across the plane of the stator, connecting means for the stator plates attached to said insulating means, and spacers of less dimensions than said connecting means located between the latter and said insulating means to provide air spaces between said connecting means and said insulating means.

10. A variable air condenser comprising a frame having metal end pieces, a rotor journaled on said end pieces, spaced stator plates, insulating means extending in a direction between and secured to both of said end pieces, and metallic supporting means for the stator plates supported by said insulating means and located between said insulating means and the rotor.

11. A variable air condenser comprising a main frame having metal end pieces, a rotor, a stator having spaced plates, insulating means carried by said frame and extending in a direction across the plane of the stator, and metallic means supporting the stator upon said insulating means and located therebetween for electrostatically shielding the insulating means.

ALLEN D. CARDWELL.